United States Patent
Bhandarkar et al.

(10) Patent No.: US 6,386,002 B1
(45) Date of Patent: May 14, 2002

(54) PROCESS ENTAILING SOL-GEL PRODUCTION OF SILICA GLASS

(75) Inventors: Suhas Dattatreya Bhandarkar, Glen Gardner; David Wilfred Johnson, Jr., Bedminster; John Burnette MacChesney, Lebanon; Thomas Edward Stockert, Millburn, all of NJ (US)

(73) Assignee: Fitel USA Corporation, Norcross, GA (US)

( * ) Notice: Subject to any disclaimer, the term of this patent is extended or adjusted under 35 U.S.C. 154(b) by 0 days.

(21) Appl. No.: 08/971,460

(22) Filed: Nov. 17, 1997

Related U.S. Application Data

(63) Continuation of application No. 08/645,859, filed on May 14, 1996, now abandoned.

(51) Int. Cl.[7] .............................................. C03B 37/16
(52) U.S. Cl. ....................... 65/395; 423/338; 252/315.6; 252/313.2
(58) Field of Search ............................ 423/338; 65/395, 65/396; 252/315.6, 313.2

(56) References Cited

U.S. PATENT DOCUMENTS

| | | | | |
|---|---|---|---|---|
| 3,709,664 A | * | 1/1973 | Krekeler ........................ | 23/285 |
| 4,726,828 A | * | 2/1988 | Clasen ........................... | 65/18.1 |
| 4,767,429 A | * | 8/1988 | Fleming | |
| 4,840,653 A | * | 6/1989 | Rabinovich | |
| 5,063,179 A | * | 11/1991 | Menashi ......................... | 501/12 |
| 5,116,535 A | * | 5/1992 | Cochrane .................... | 252/313.2 |
| 5,196,177 A | * | 3/1993 | Watanabe .................. | 252/313.2 |
| 5,215,733 A | * | 6/1993 | Potter ............................ | 423/338 |
| 5,246,624 A | * | 9/1993 | Miller ......................... | 252/313.2 |

OTHER PUBLICATIONS

Fischer, E, Colloidal Dispersions, 1950, p. 266 John Wiley & Sons.*

* cited by examiner

*Primary Examiner*—John Hoffmann
(74) *Attorney, Agent, or Firm*—George S. Indig

(57) ABSTRACT

A silica-water dispersion suitable for use as a sol for sol-gel fabrication is produced from a silica-water mixture with addition of alkaline agent. The agent functions to increase viscosity so as to improve dispersing efficiency during shear mixing.

9 Claims, 2 Drawing Sheets

PROCESS ENTAILING SOL-GEL PRODUCTION OF SILICA GLASS

This application is a continuation of application Ser. No. 08/645,859, filed on May 14, 1996 abandoned.

BACKGROUND OF THE INVENTION

1. Field of the Invention

Fabrication of silica glass articles by the colloidal sol-gel process.

2. Description of Related Art

After many years of effort, the colloidal sol-gel process for making silica glass is coming into prominence.

The first step in the basic process is preparation of a dispersion (or "sol") of fine silica particles in water by shear-mixing. To avoid premature gelling, a "stabilizer" is usually added to the prepared dispersion. The stabilizer—commonly a tetrammonium hydroxide—maintains the sol alkaline, so that the particles are charged negatively and repel each other. Gelation is begun by use of a pH-lowering gelling agent—e.g., methyl formate or another water-soluble hydrolyzable ester—which effectively neutralizes charge on the particle surfaces thereby permitting particle agglomeration, and initiating gelling. Thereafter, the gelatinous medium is dried and consolidated to make pore-free glass. The process would supplant high-temperature vapor-transport procedures now in commercial use in the manufacture of silica glass.

Preparation of silica using the sol-gel process has been thwarted by a number of problems. A meaningful breakthrough is described in U.S. Pat. No. 5,240,488, Aug. 31, 1993. That patented process overcomes the well-recognized yield problem for kilogram and larger crack-free bodies. It depends on a small inclusion of an organic polymeric material, which after serving its purpose decomposes and/or volatilizes during subsequent high-temperature processing. A near-term benefit of the process is to permit substitution of sol-gel-derived overcladding tubes for the commercial (soot-derived) tubing now used in the fabrication of composite preforms from which optical fiber is produced.

The individual steps have been restudied to optimize the process.

While dispersions had earlier been prepared from ground sand, fumed silica with its high purity and better control has become the more usual starting material for fiber and other demanding purposes. U.S. Pat. No. 5,116,535, May 26, 1992, best represents the state of the art for preparation of fumed silica dispersions.

Consistent with earlier practice, the patented procedure relies on shear-mixing of a particle-water mixture, however, of higher silica loading than desired in the ultimate product. Following mixing, the initial suspension is diluted with additional water to yield the final suspension of desired silica loading, typically of $\geq 35$ wt. % silica. Stabilizer is avoided before and during mixing—in accordance with current practice is thereafter introduced in desired amount for required shelf-life.

U.S. Pat. No. 5,246,624, Sept. 21, 1993, describes and claims a different method for forming a silica-water dispersion. That method requires acidification of the initial mixture prior to dispersing for the stated purpose of enhancing wetting of the silica particles and thereby aiding mixing. Such acidified dispersions are undesirable for many purposes—may contain undesirable contaminants; may cause corrosion of dispersion apparatus; upon addition of stabilizer may result in salt formation which modifies the rheological properties of the dispersion.

Examples in '624 introduce excess silica before dispersing, and provide for dilution afterwards as in '535. Conventional pH-increase stabilizes the dispersed material.

Silica-water dispersions may serve uses unrelated to sol-gel fabrication. For example, they are used for Chemical Mechanical Polishing (CMP) in the fabrication of integrated circuits.

SUMMARY OF THE INVENTION

A dispersing process alternative to that of U.S. Pat 5,116,535 has been used successfully in sol-gel manufacture, and is applicable to production of overcladding tubes for optical fiber. Its evolution is traced to an improved fundamental understanding of the colloidal sol-gel process.

In accordance with the invention, dispersing efficacy is assured by adjusting pH of the silica-water mixture prior to or during dispersing. The amount of pH-adjusting agent added results in an increase of the particle-to-particle attractive forces—the same forces responsible for initiation of gelation. In fact, adjustment increases gelation rate—destabilizes the initial mixture—so that dispersing efficiency is, in this sense, found related to the phenomenon of gelation itself. It is generally anticipated that the initial mixture, in being constituted of fumed silica particles in water, is at sufficiently low pH so that adjustment in accordance with the teaching requires increasing pH.

By increasing pH so as to fall within this region of increased rate of gelation, the "steady-state" viscosity of the initial mixture, as measured during or immediately after dispersing, is increased. The invention teaches a direct relationship between this viscosity and effectiveness of dispersing. A "final viscosity" value, measured at a reference pH value suitable for stabilization of the dispersion, is found to vary in a direction opposite to that of the steady-state viscosity, so that dispersing effectiveness may be measured in terms of this "final value".

As a consequence of the present work, it is realized that one role played by the excess silica loading of U.S. Pat. No. 5,116,535, is to increase viscosity—with the effect of improving dispersing efficiency. An embodiment of this invention employs excess loading as an ancillary procedure, under circumstances that pH adjustment and excess loading cooperate to produce a further increased steady-state value of viscosity.

Terminology

Primary Particle—Void-free silica particle in which all molecule-to-molecule association is due to siloxane bonding. (Primary particles are sometimes described in the literature as "spherical particles".)

Aggregate—Mass of two or more primary particles held together by siloxane bonding.

Agglomerate—Mass of primary particles and/or aggregates held together by means other than siloxane bonds, e.g., by van der Waals forces or hydrogen bonds.

Silica Sol or Silica Dispersion—Silica-water suspension in which the suspended medium consists of silica primary particles or aggregates—in which agglomerates are substantially excluded.

Steady-State Viscosity—Viscosity attained during dispersing—so named since viscosity, while dropping substantially at the commencement of mixing, changes relatively little from commencement to the completion of dispersing. (In the work reported here, the value was measured immediately after mixing.)

Final Viscosity—Viscosity of a stabilized sol—used as an indicator of dispersing efficacy and of attainment of a sol of substantially unagglomerated silica. Final viscosity in the reported work, is measured at pH 12.8 and with a silica loading of 44 wt. %. The terminology does not impose a requirement for any specific loading nor for stabilization at this or any other pH on the claimed invention—use of an unstabilized dispersion is contemplated.

Initial Mixture—As differentiated from "dispersion", this is the initial undispersed silica-water mixture as may be introduced into the mixing apparatus. (Under some circumstances, addition of silica may be stepwise or continuous during dispersing, so that the "initial mixture" may not exist in totality at any instant.)

Gelation Region—Expressed in terms of pH range, this defines the initial mixture, now modified by addition of alkaline additive, including a peak at which gelation proceeds at a rate an order of magnitude larger than the boundary values of the range. (Under conditions of a preferred embodiment, in which the initial mixture consists largely of an unmodified aqueous mixture of fumed silica, the peak pH value lies at about pH7.5 and the range extends from pH6 to pH9. Outside the boundary values a period of several days is required for "gelation"—whereas at the peak, here identified as corresponding with an increase in viscosity to $\geq$50,000cp, a period of 24 hours suffices.)

DETAILED DESCRIPTION

General

Figure 1:
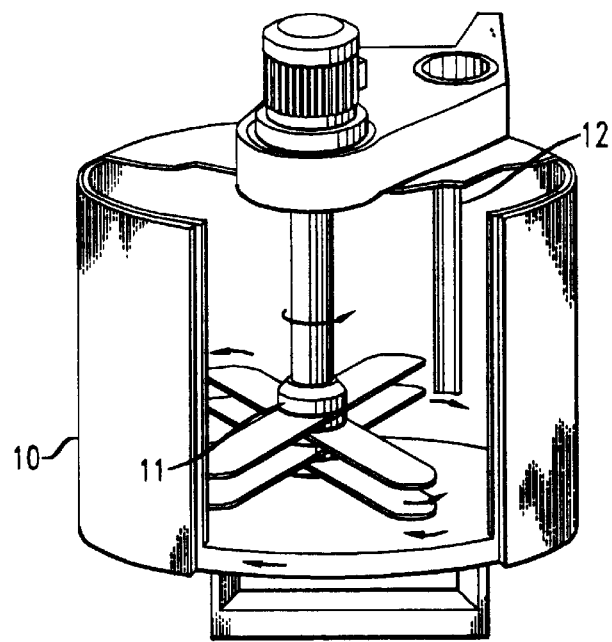
FIG. 1 is a front elevational view of a commercial high shear mixer suitable for making an aqueous silica dispersion for the purpose of the invention.

The invention depends on introduction of a pH-adjusting agent to the initial mixture for assuring effective dispersing. The amount added is sufficient to cause pH to fall within a region of increased rate of gelation ("gelation region"). The effect of the addition is to increase viscosity under the influence of forces regarded as responsible for initiation of gelation. In this sense, the teaching is self-inconsistent, in that effective dispersing, designed to stabilize the mixture, i.e., to prevent unwanted premature gelation, is advanced by deliberately adjusting pH to result in instability.

Discussion is in terms of the usual initial mixture using fumed silica particles. Such a mixture, as unmodified, is of pH $\geq$2–5, generally within the range of 3.75–4.25. The "gelation region" generally corresponds with pH in the range of 6–9, so that the teaching is, under these conditions, implemented by addition of pH-increasing agent.

Present study shows a reliable relationship between viscosity during dispersing ("steady-state" viscosity) and dispersing effectiveness, with effectiveness improving as steady-state viscosity increases. Effectiveness has been measured in terms of viscosity of a stabilized dispersion, with measurement conducted under uniform conditions of pH for comparison purposes.

It is found that there is a peak in steady-state viscosity e.g., for the conditions described, at about pH7.5, and that attainment of this peak value, or more generally of values within a range including this peak value, permits most effective dispersing. Stabilized sols—ordinarily $\geq$pH10—exhibit low viscosities which are undesirable for shear mixing. At these high pH values, the dispersed particles are negatively charged sufficiently such that repulsion forces are not overcome by the attractive forces (e.g., van der Waals forces) required for gelation. The peak value in steady-state viscosity corresponds with a maximum value of uncompensated attractive forces. The "gelation region" for dispersing in accordance with the invention, corresponding with a useful viscosity range for dispersing, includes this viscosity peak.

The alkaline additive used in dispersing may, if desired, be the same additive which, as added in greater quantity, serve to stabilize the dispersion—may constitute what the artisan regards as "stabilizer".

As discussed under "Mechanism", the high-viscosity peak varies somewhat with a number of conditions, some of which are discussed under "Examples". It is best located empirically—using a plot of viscosity v. pH values for each new set of conditions. Most effective mixing corresponds with peak viscosity—the only reservation being apparatus limitations, i.e. viscosity values too high to permit circulation of the mixture through the high-shear section of the dispersing apparatus. (Where apparatus capability is limiting, there may be two separated pH ranges, straddling the peak.)

Use of excess silica loading during dispersing (followed by dilution afterwards) also increases steady-state viscosity, and this, in combination with pH-adjustment, may further improve dispersing effectiveness. Justification depends on cost.

Appropriate conditions for dispersing are founded on extensive data including that reported in the section, "Method and Results".

Mechanism

While the invention is an outgrowth of an improved understanding of the sol-gel process, the understanding is not complete. To an extent, the teaching relies on measured results, and not on mechanism. As an example, two gelation mechanisms are discussed in the literature. One relies on isoelectric point (IEP). The requirement is for charge neutrality on the sol particles themselves. Reported values of IEP, generally based on aqueous mixtures of crushed natural quartz, are ~pH 2.2. Another mechanism invokes shielding—a surrounding layer compensates for surface charge and leads to higher pH values at gelation. In either event, textbook description generally relies on van der Waals forces between aggregates for gelation. Charge repulsion opposes gelation. In present practice, sols are stabilized at high pH levels—typically pH$\geq$10—so that repulsion is due to negative charges. Discussion is generally in these terms, although acidities below the gelation region resulting from use of unmodified water mixtures of fumed silica, or as further acidified (e.g., in accordance with U.S. Pat. No. 5,246,624), can invoke positively-charged particles, also serving for stabilization. Regardless of mechanism; regardless of pH of the initial mixture, the advance increases viscosity during mixing by adjusting pH to increase gelation rate.

It is interesting to consider the role played by the usual invention-employed alkaline additive. A material used in the examples—tetramethyl ammonium hydroxide (TMAH)—is commonly-used for stabilization and decreases viscosity. In the amounts presently used, however, it has the opposite effect and increases viscosity. In such amounts, the additive may be viewed as a destabilizer.

A relevant value for pH-induced viscosity is "steady-state viscosity". At the start, mixing causes a precipitous drop in viscosity. Thereafter, viscosity shows very little change as dispersing continues. Satisfactory dispersing depends on mixing time as well as on steady-state viscosity, so that, characteristically, mixing must be continued for a period of perhaps 15–30 minutes for best stability. Attainment of the defined value of final viscosity is a reliable indicator of satisfactory dispersing.

Composition

It is known that stable high-concentration sols are more easily obtained for powders having lower values of specific surface area—generally for powders of specific surface <75 $m^2/g$. Silica in the range 40 $m^2/g$–50 $m^2/g$ is commercially available and is satisfactory. The general objective in this work requires loadings $\geq 35$ wt. % (based on the total sol). Material used in the Examples was the largest particle size of commercially available fumed silica, a grade denoted "colloidal silica" –55nm (equivalent spherical diameter) particles, with a specific surface area of about 50 $m^2/g$. As unmodified, initial silica-water mixtures had pH values 22.5.

Method and Results

The dispersing apparatus used in the Examples is shown in FIG. 1. It consists of a drum 10, agitating blade 11, and scraper 12. In one form of apparatus, drum 10 revolves in a direction counter to that of the blade with scraper 12 stationary.

The procedure used in developing data for the plotted points is described.

The aqueous suspension medium was prepared by first introducing water into the drum of the dispersing apparatus. Needed amounts of alkaline additive for the desired pH were introduced from a prepared solution of 25 vol. % TMAH in water. Fumed silica powder –55nm equivalent spherical diameter, 50 $m^2/g$ specific surface area—was added in installments. (In optimized commercial operation, some of the silica may be added while mixing, e.g. to follow a schedule for maintaining viscosity at a maximum value within the capability of the dispersing apparatus.) In the reported work, the disperser operated at 4200 rpm during silica addition. This was equivalent to a tip speed of about 30 m/s (linear velocity as measured at the tip of the mixing blade at a position furthest removed from the shaft—a conventionally-used measure for shear mixing). Dispersing was continued for 30 minutes.

Sufficient additional TMAH and water if necessary were added to the shear-mixed sol after mixing to increase pH to the stabilized value of 12.8 for measurement of final viscosity. Delay for as little as 300 minutes before stabilization results in measurable viscosity increase due to gelation and may impede homogenization.

There is further experimental support for dependence on final viscosity as a measure of unagglomerated silica. U.S. Pat. No. 5,344,475 issued Sept. 6, 1994, teaches centrifugation of the stabilized sol as a means for removing "refractory" particles and larger silica agglomerates. Centrifugation practiced on sols of the invention show increased agglomerate separation for samples of lower steady-state viscosity. The observation may serve as a criterion for measuring dispersing efficiency.

Based on final viscosity measurements, mixing time of 15 minutes was adequate for all compositions tested. Apparatus used in the examples had a 20 liter capacity drum. Apparatus for continuous commercial use may have a capacity of 250 liter or greater. Apparatus designed for commercial implementation is capable of greater tip speeds—it is likely that a 15-minute dispersing time will continue to be adequate in commercial practice.

The alkaline agent used was TMAH—in other work TMAH was replaced by the ethyl or isopropyl homolog, or by unsubstituted $NH_4OH$. While convenient to use the same material ultimately serving as stabilizer, the viscosity-increasing function shows the same pH dependence for other non-metallic alkaline compounds. (Metallic cations may contain undesirable contaminants—may otherwise affect the viscosity-increasing objective, and will not ordinarily be used, at least in production of optical fiber.) The amount of additive under anticipated commercial conditions is, in any event, described in terms of attained pH.

Figure 2:
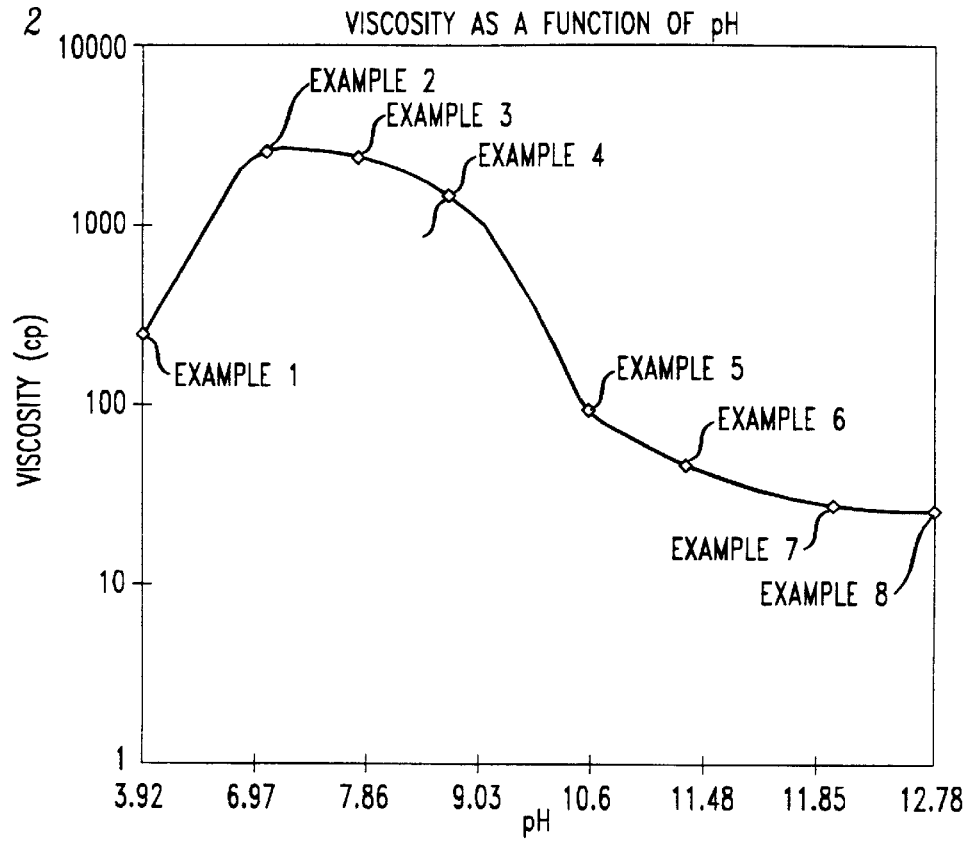
FIG. 2, on coordinates of pH and the logarithm of steady-state viscosity, shows the relationship between those parameters for a representative water-silica mixture.

Data of the form plotted on FIG. 2 is usefully developed before specifying production conditions. Data points correspond with numbered examples as indicated. It is seen that approaching the viscosity peak either from a lower or higher pH value is functionally equivalent (although there is some preliminary indication that the curve of permitted values is asymmetric, with greater permitted pH range on the more alkaline side of the peak).

From the standpoint of dispersing efficiency, viscosity is maximized. There may be reasons justifying operating below highest attainable viscosities. The effect of pH adjustment in accordance with the present teaching continues to increase dispersing efficiency so long as the steady-state viscosity peak is approached.

Figure 3:
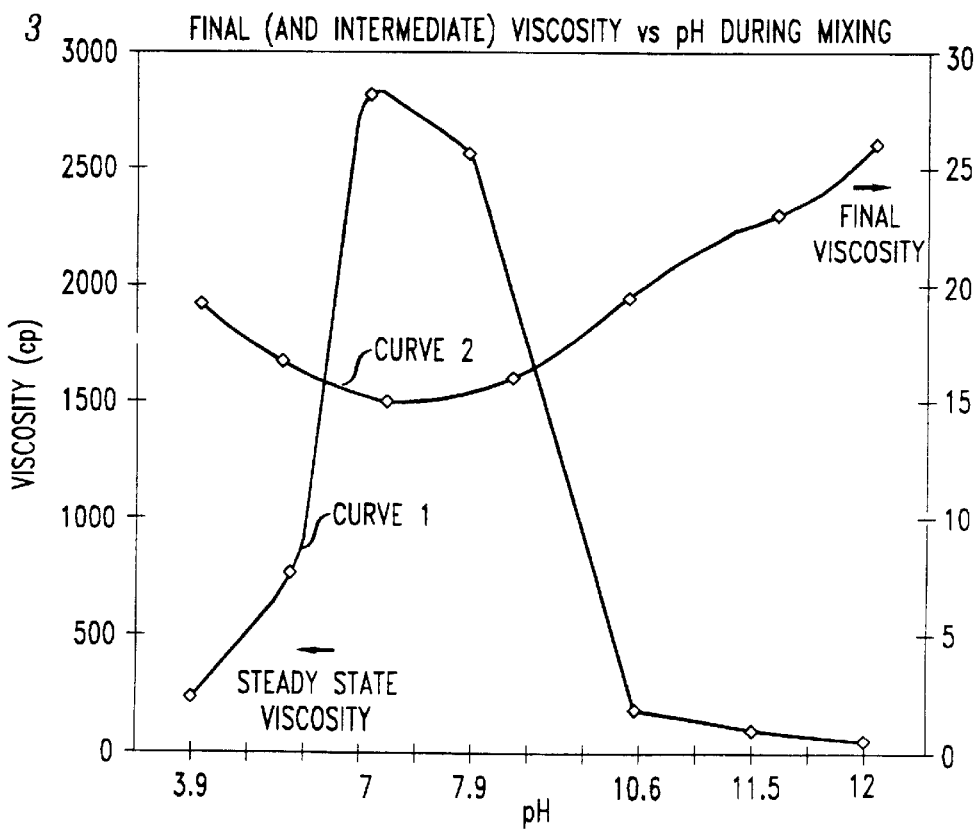
FIG. 3 is constituted of two curves, one for final viscosity, and the second for steady-state viscosity, both plotted on abscissa values of pH of the mixture during mixing.

The curves of FIG. 3 are a measure of dispersing effectiveness. Curve 1 is a plot of steady-state viscosity values. Curve 2 shows corresponding data points after stabilization. Best results, measured in terms of low stabilized viscosity values correspond with higher steady-state values. Abscissa values are those of pH during mixing.

The excess silica loading of U.S. Pat. No. 5,116,535 may serve to further enhance mixing efficiency. Three Examples, set forth in columnar form, are supportive. Three different total amounts of silica powder were added: the first for yielding the final desired 44 wt. % (at which all final viscosities were measured) and a second and third at 52.5% and 55.0% (for supplementing pH adjustment with overloading—followed by needed dilution to the final 44 wt. % loading). In the instance of Example 16, except for silica amount, all were conducted under the conditions of Example 11.

| Example | Silica Loading in Initial Mixture | Final Viscosity |
| --- | --- | --- |
| 16 | 46% | 15 cp |
| 17 | 52.5% | 11.5 cp |
| 18 | 55% | 10 cp |

Final viscosity values were measured after dissolution to bring the final dispersion to a uniform value. (In the instance of Example 16, stabilization with sufficient aqueous TMAH to increase the dispersion to pH12.8 reduced loading from an initial value of 46 wt. % to 44 wt. %.) In other experimental work, silica loading was increased to 65 wt. % with further improvement in dispersing efficiency. Still greater loadings are possible—facilitated with lowered specific surface areas.

Optical Fiber Fabrication

It is likely that initial commercial use will be in the fabrication of overcladding tubing which, together with a core produced by a vapor transport method, constitutes a composite preform for manufacture of optical fiber. Sol-gel material produced from dispersions in accordance with the invention is found suitable for this purpose. As compared with commercially-available overcladding, improved yield of good dispersion by the present process translates into cost saving in the final fiber.

Figure 4:
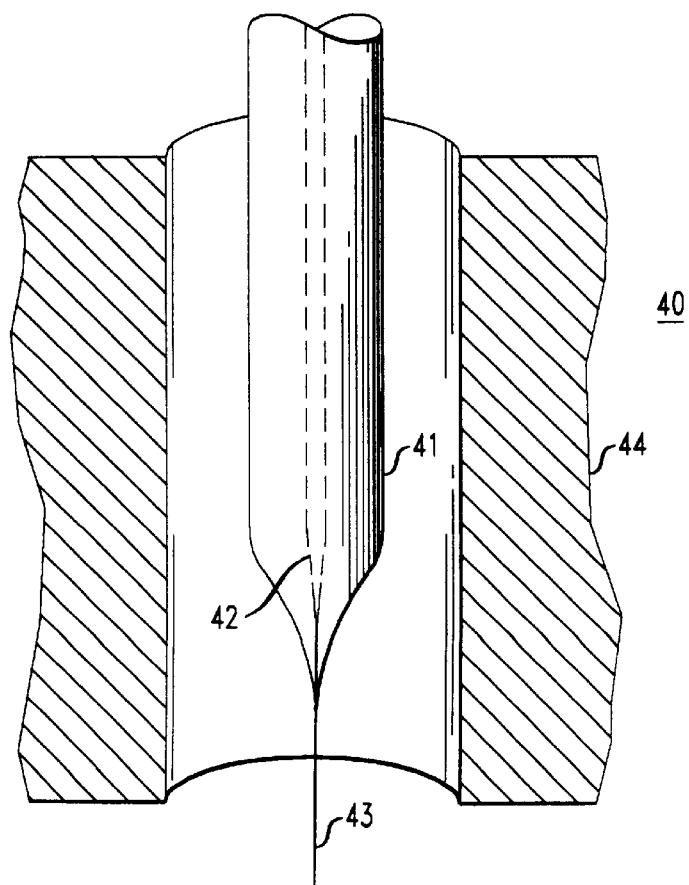
FIG. 4 is a perspective view showing a fiber drawing process using a composite preform.

FIG. 4 is a perspective view showing a preform 40 constituted of an overcladding tube 41 encompassing a core rod 42 in the process of being drawn into a fiber 43. Processing is taking place within a furnace 44. U.S. Pat. No. 5,240,488, hereby incorporated by reference, describes the state-of-the-art fiber fabrication procedure usefully employed with dispersions of the examples.

Processing Variants It has been indicated that the required amount of alkaline additive is that necessary to increase steady-state viscosity. Alkalinity sufficient to produce a four-fold increase in viscosity, is appropriately specified for initial mixtures of fumed silica and water. Operation on the unmodified mixture used in Examples 1 through 7, with reference to the curve of FIG. 2, leads to a steady-state viscosity $\geq 1000$ cp, and this represents a desired minimum, corresponding with a final viscosity of 15 cp. Preferred viscosity values, if tolerated by the mixing apparatus, are $\geq 2000$ cp, with a greater preference for largest attainable viscosities (for the conditions of the plotted Examples, the peak value was approximately 3000 cp).

Sol-gel fabrication providing for direct gelation, without stabilization of the sol, is under study. Accordingly, stabilization of a test specimen might be carried out for the sole purpose of measuring dispersing efficiency.

It is expected that sol-gel fabrication, at least as applied to more demanding uses such as optical fiber production, will continue to use centrifugation or other physical separation in accordance with U.S. Pat. No. 5,344,475, issued Sept. 6, 1994. While a prime function is removal of "refractories", agglomerates are also removed. Dispersing conditions may be tailored to share responsibility between the two processes, although physical separation results in some loss of silica, so that reliance will usually favor effective dispersing.

Experimental results have been for final 44 wt. % $SiO_2$ loadings. This particular value represents the maximum loading which is reliably-attainable with the particular starting materials used. The 44 wt. % loading used in examples is illustrative of present practice. Higher loadings further reduce shrinkage and crack incidence, and it is likely that optimization e.g., of particle size and/or surface area will permit greater loading in future commercial use

The invention claimed is:

1. Process comprising forming a silica sol of substantially unagglomerated silica, the process comprising the steps of forming an initial mixture of silica particles in water and subjecting the mixture to shear-mixing, thereby forming the silica sol, including an agent in the initial mixture so that the pH is a value in the range of pH6 to pH9, in which the agent comprises alkaline material containing no metal cation.

2. Process of claim 1 in which the silica particles comprise fumed silica.

3. Process of claim 2 in which the viscosity of the mixture during shear-mixing is at least 1,000 cp, wherein the process further comprises a step of stabilizing the sol after the shear-mixing by increasing the pH to a stabilized pH value.

4. Process of claim 3 in which the initial mixture contains at least 44 wt % $SiO_2$, in which the stabilized pH value is at least pH12.8 and in which final viscosity of the sol after stabilizing is $\leq 15$ cp.

5. Process of claim 1 including adding alkaline stabilizer to the sol after the shear the mixing, thereby increasing the pH to a stabilized pH value thereby producing a stabilized silica sol.

6. Process of claim 5 in which the stabilized silica sol contain at least 44 wt % $SiO_2$ and has a stabilized pH value of at least pH12.8.

7. Process of claim 5 including the step of reducing the pH of the stabilized sol from its stabilized pH value, thereby initiating gelation and producing a gelled body.

8. Process of claim 7 including the steps of drying and consolidating the gelled body to produce an overcladding tube, inserting a core into the tube to make a composite preform, and drawing fiber from the preform.

9. Process of claim 1 including the additional process step of diluting the shear-mixed sol by addition of water.

* * * * *